United States Patent [19]

Videtto

[11] 4,126,479
[45] Nov. 21, 1978

[54] MAGNESIUM ALUMINATE SPINEL BOND FOR REFRACTORY BRICK

[75] Inventor: Ralph B. Videtto, Pleasanton, Calif.

[73] Assignee: Kaiser Aluminum & Chemical Corporation, Oakland, Calif.

[21] Appl. No.: 833,546

[22] Filed: Sep. 15, 1977

[51] Int. Cl.$^2$ .............................................. C04B 35/04
[52] U.S. Cl. ........................................ 106/62; 106/59
[58] Field of Search .................................. 106/62, 59

[56] References Cited

U.S. PATENT DOCUMENTS

| | | | |
|---|---|---|---|
| 2,775,525 | 12/1956 | Austin et al. | 106/59 |
| 3,184,322 | 5/1965 | Parikh et al. | 106/62 X |
| 3,954,488 | 5/1976 | Coatney | 106/62 |
| 4,045,234 | 8/1977 | Ring | 106/62 |

FOREIGN PATENT DOCUMENTS 212,021  1957 Australia .................................. 106/62

OTHER PUBLICATIONS

Bailey, J. T., et al. "Magnesia-Rich MgAw$_2$O$_4$ Spinel Ceramics" Amer. Cer. Soc. Bull. (1971) 50(5) pp.493–496.

*Primary Examiner*—Helen McCarthy
*Attorney, Agent, or Firm*—Paul E. Calrow; Malcolm McQuarrie

[57] ABSTRACT

A magnesium aluminate spinel-bonded refractory can be formed which does not exhibit undue expansion (due to the reaction of magnesia and alumina to form magnesium aluminate spinel) between the raw, compacted state and the fired, ceramically bonded state when fired to a temperature of 1400° C if a very finely divided alumina with dense particles is used. More specifically, the alumina used has an average particle size of less than 5, preferably less than 2, microns, and a specific surface of less than 30 m$^2$/g, preferably about 5 m$^2$/g (i.e., the small crystallites or particles are dense and do not have a high surface area, as do finely divided active aluminas).

7 Claims, No Drawings

MAGNESIUM ALUMINATE SPINEL BOND FOR REFRACTORY BRICK

BACKGROUND OF THE INVENTION

This invention pertains to refractories, and particularly to refractories containing magnesium aluminate.

Magnesium aluminate and magnesium aluminate bonded refractory shapes are well known. Among their advantages, particularly compared with other basic refractories such as all magnesia brick, are better thermal shock resistance, lower thermal expansion, and lower thermal conductivity. Also a magnesium aluminate refractory shape has an advantage over a chrome-containing refractory in the growing number of applications in which chromium is considered a contaminant.

Despite their known advantages, magnesium aluminate refractories are not widely used, principally because of the difficulty of forming a dense, strong shape from them. The main reason for this difficulty is that when magnesia and alumina react at elevated temperatures to form magnesium aluminate there is a volume expansion. This, in the usual case, results in disruption of the refractory, often in actual expansion of the refractory, which in turn leads to low strength and high porosity.

Various prior art solutions to this problem have been proposed. U.S. Pat. No. 3,184,322, suggests the use of $TiO_2$ as a flux, together with a finely divided alumina of specified specific gravity and malachite green decolorizing power. U.S. Pat. No. 3,333,971, suggests overcoming the problem of volume expansion upon formation of magnesium aluminate by adding zirconia to the admixture. U.S. Pat. No. 3,577,247 suggests another solution, namely initially forming magnesium aluminate with an excess of magnesia and then using this material in a brick mix containing sufficient fine alumina to react with the prereacted magnesium aluminate to ultimately form a magnesium aluminate closer to stoichiometric. It has also been suggested, in U.S. Pat. No. 3,950,504, to form magnesium aluminate spinel grain or aggregate using electrostatic precipitator dust fines as the source of alumina, such material having a relatively fine particle size and being extremely high in specific surface.

The present invention is directed to a solution of the problem of expansion upon forming magnesium aluminate spinel in situ in a refractory shape.

SUMMARY OF THE INVENTION

It has now been found, according to this invention, that a dense, strong magnesium aluminate bonded refractory shape which shows no expansion (as compared to its unfired, compacted state) after firing to a temperature of 1400° C. can be formed by admixing from 60 to 90 percent refractory aggregate coarser than 44 microns with from 5 to 36 percent magnesia having a specific surface of at least 5000 $cm^2/g$, substantially all the magnesia being smaller than 44 microns, with from 4 to 15 percent alumina less than 44 microns in size and having a specific surface of from 2 to 30 $m^2/g$ and an average particle size of less than 5 microns; compacting the admixture; and heating the compacted admixture to at least 800° C.; all percentages being by weight and based on the total weight of the admixture.

DETAILED DESCRIPTION

The aggregate used can be any refractory material compatible with the magnesium aluminate matrix. However, the invention has definite advantages when the aggregate itself is magnesia, for example dead-burned magnesite or periclase. Although the dividing line between the relatively coarse aggregate and the relatively fine matrix is to some extent arbitrary, and perhaps even overlapping, for purposes of defining the present invention the matrix material will be considered that which is less than 44 microns (0.044 mm) in size (i.e., that which passes a 325 mesh screen), and the aggregate will be considered material that is coarser than this. The aggregate will be sized for good brickmaking, to achieve maximum density, as is well known in the art, and will be, for example, substantially all smaller than 4.7 mm (minus 4 mesh).

The magnesia used to form the magnesium aluminate spinel will substantially all be finer than 44 microns and will have a specific surface of at least 5000 $cm^2/g$, preferably about 10,000 $cm^2/g$; its average particle size will be about 6 microns. Generally, it will be necessary to ball mill dead burned magnesite or periclase or other source of magnesia to obtain this sizing. Chemically, the fine magnesia will be at least 95% MgO, the remainder being normal impurities such as $SiO_2$, CaO, $Al_2O_3$, $Fe_2O_3$, and the like. Preferably it will contain 98% MgO, particularly when the lime and silica contents are such as to form dicalcium silicate as a secondary phase. The reason for this is that dicalcium silicate tends to form relatively low melting eutectics with spinel materials, and any substantial amount of dicalcium silicate will tend to reduce the high temperature strength of these refractories.

The alumina used to form the magnesium aluminate spinel is a crucial feature of this invention. First, it is desired that it be relatively quite fine, having an average particle size of less than 5 microns, and preferably less than 2 microns. However, it is equally important that the alumina not have too large a specific surface, i.e. the alumina particles should not be porous masses or agglomerates of finer crystallites. Quantitatively, this is characterized by requiring the alumina to have a specific surface of from 2 to not over 30 $m^2/g$, preferably about 5 $m^2/g$. Lightly calcined aluminas and electrostatic precipitator dust (collected, for example, from the exhaust of a rotary kiln in which alumina is being calcined) are not suitable for use in this invention, such materials being highly porous, and consequently water absorbant, with specific surfaces of 100 $m^2/g$ or higher. Generally, the alumina used will be ground to the requisite size. Since it is relatively difficult to comminute single crystallites of alumina (which is a very hard and abrasive material), the alumina used in this invention is best made by calcining aluminum hydroxide under such conditions, for example in the presence of a mineralizer, so that the crystallites of alpha alumina which are formed are themselves quite small (of the desired ultimate size for the alumina used in this invention), even though they may exist in agglomerates. The alumina thus formed can then be milled down to the ultimate crystallite size by breaking up the agglomerates. Chemically, the alumina will contain at least 95%, and preferably at least 99%, $Al_2O_3$, the remainder being normal impurities.

In practicing this invention, fine magnesia and fine alumina of the requisite particle size will be prepared. While it may be possible to grind these two materials together, it will generally be found more convenient, principally because of the different grinding characteristics of the two materials, to grind them separately and then combine them.

Although, as is well known, the stoichiometric proportions of magnesia and alumina in magnesium aluminate spinel are approximately 28 parts by weight magnesia to 72 parts by weight alumina, it is not necessary in the practice of this invention to adhere exactly to these proportions, and the proportions of these two materials can vary as much as from 25 to 85 parts fine magnesia to 75 to 15 parts fine alumina. In other words, the matrix of a brick according to this invention will contain from 25 to 85 percent magnesia and from 75 to 15 percent alumina, the percentages being based on the total weight of magnesia and alumina in the matrix.

The preceding proportions refer to the amount of fine magnesia and alumina in the matrix. From the point of view of the overall composition of a refractory shape, the amount of aggregate will be from 60 to 90 percent and the matrix from 40 to 10 percent, the percentages being based on the total weight of aggregate and matrix. Preferably the proportions will be from 60 to 80 percent aggregate and from 40 to 20 percent matrix. Stated somewhat differently, a brick composition according to this invention will have from 60 to 80 percent refractory aggregate, from 5 to 36 percent, preferably from 15 to 25 percent, fine magnesia and from 4 to 15 percent fine alumina.

In making a refractory shape according to this invention, the aggregate and matrix materials will be combined, as is well known in the art, with a tempering agent such as water and a bonding material, either an organic bond such as a lignosulfonate or a chemical bond such as magnesium sulfate. This admixture will then be pressed into shapes, for example bricks, at pressures such as 10,000 or 15,000 psi (700 or 1400 kg/cm$^2$), and then, if desired, fired, for example to temperatures of 1400° C. or 1600° C. or even higher. However, the shapes of this invention may be shipped unfired (chemically bonded) by the manufacturer and be heated only when placed in use, for example, in a furnace.

It is one of the advantages of products made according to this invention that, after firing to such temperatures, they do not show expansion, compared to their pressed but unfired size (due to the formation of magnesium aluminate spinel, as described above), but rather actually show some firing shrinkage, the shrinkage being greater at higher firing temperatures. This means that such shapes are denser (i.e., have lower porosity, generally less than 16 volume percent), and are stronger than prior art magnesium aluminate spinel-bonded refractories. In addition, they have the usual advantages of magnesium aluminate bonded refractories, good thermal shock resistance and relatively low thermal conductivity and thermal expansion, as compared to all magnesia refractories.

While it is not known with certainty why the present invention works, and applicant does not wish to be bound to any specific theory, it is believed that the alumina used is of such fine particle size that the reaction between the alumina and magnesia to form magnesium aluminate spinel takes place at a relatively low temperature, perhaps as low as 800° C., but in any case in a temperature range below that at which other ceramic bonds are formed in the structure. Thus, if such other ceramic bonding occurs only after the magnesium aluminate spinel has formed, then the volume expansion accompanying the spinel formation will not disrupt such ceramic bonding. It is believed that the problem with prior art compositions is that the spinel formation and the other ceramic bonding take place at roughly the same temperature and the volume expansion of the spinel reaction tends to disrupt the ceramic bonds which have begun to form, leaving a weak and porous structure.

EXAMPLES

The compositions and properties of several examples of brick made according to this invention are given in Table I, the compositions being shown in parts by weight. The parts by weight of the periclase (magnesia) grain less than 44 microns (minus 325 mesh) in size are shown for each composition.

Grain A is a synthetic periclase (made from sea water) having the following typical chemical analysis: 0.9% CaO, 0.5% SiO$_2$, 0.1% Al$_2$O$_3$, 0.2% Cr$_2$O$_3$, 0.4% Fe$_2$O$_3$, less than 0.1% B$_2$O$_3$, and (by difference) 97.8% MgO. Substantially all this grain was less than 4.7 mm in size (minus 4 mesh), the sizing being adjusted to achieve maximum pressed density in the formed brick.

Grain B is a synthetic periclase (made from inland brine) having the following typical chemical analysis: 0.6 CaO, 0.8 SiO$_2$, 0.2 Al$_2$O$_3$, 0.2 Fe$_2$O$_3$, 0.1 B$_2$O$_3$, and (by difference) 98.1% MgO. Again the grain was sized according to well known brickmaking sizing, substantially all being finer than 4.7 mm (minus 4 mesh).

Grain C is a prereacted magnesia-chrome grain with about 61% MgO, 15% Cr$_2$O$_3$, 13% Al$_2$O$_3$, 9% Fe$_2$O$_3$, and about 1% each SiO$_2$ and CaO. It was sized so that substantially all was smaller than 4.7 mm (minus 4 mesh) and substantially all coarser than 0.3 mm (+48 mesh).

Grain D is a Transvaal chrome ore of a kind known as "double washed concentrates". This latter designation indicates that the raw ore has been beneficiated by washing to reduce the SiO$_2$ content. A typical chemical composition for this ore is: 45.5% Cr$_2$O$_3$, 28.6% Fe$_2$O$_3$, 15.1% Al$_2$O$_3$, 9.9% MgO, 0.8% SiO$_2$, and 0.1% CaO. It was sized so substantially all was smaller than 0.83 mm (minus 20 mesh) and all coarser than 44 microns (+325 mesh).

Table I

| Composition | 1 | 2 | 3 | 4 | 5 | 6 | 7 | 8 | 9 | 10 |
|---|---|---|---|---|---|---|---|---|---|---|
| Grain A | 90.4 | 89.8 | 89.8 | 28.8 | 29.4 | 29.4 | 87.0 | — | — | — |
| Grain B | — | — | — | — | — | — | — | 90.4 | 92.4 | 94.4 |
| Grain C | — | — | — | 48.0 | 48.0 | 48.0 | — | — | — | — |
| Grain D | — | — | — | 16.6 | 16.6 | 16.6 | — | — | — | — |
| −44 μMgO | 19.3 | 17.2 | 17.2 | 20.8 | 21.6 | 21.6 | 19.3 | 17.3 | 18.8 | 20.4 |
| Alumina | 8.1 | 8.1 | 8.1 | 4.0 | 4.0 | 4.0 | 11.5 | 8.1 | 6.1 | 4.1 |
| Bond | 1.5M | 0.6E 1.5L | 0.6E 1.5L | 0.6E 2.0L | 1E 1L | 4P | 1.5M | 1.5M | 1.5M | 1.5M |
| Water (%) | 4.25 | 2.75 | 2.75 | 2.25 | 2.25 | 2.50 | 4.50 | 4.25 | 3.75 | 3.75 |
| Forming Pressure (psi) | 10K | 10K | 10K | 10K | 10K | 10K | 10K | 15K | 15K | 15K |
| (kg/cm$^2$) | 703 | 703 | 703 | 703 | 703 | 703 | 703 | 1050 | 1050 | 1050 |
| Firing Temp. (° C) | 1400 | 1400 | 1600 | 1750 | ** | ** | 1600 | 1630 | 1630 | 1630 |
| Linear Change (%) | −0.2 | −0.2 | −0.4 | −1.0 | — | — | −0.9 | −1.4 | −1.2 | −1.1 |
| Porosity (Vol %) | 16.9 | 16.0 | 16.0 | 15.6 | 18.2* | 13.6* | 15.8 | 13.5 | 14.2 | 14.8 |

Table I-continued

| Composition | 1 | 2 | 3 | 4 | 5 | 6 | 7 | 8 | 9 | 10 |
|---|---|---|---|---|---|---|---|---|---|---|
| CMOR (psi) | 1925 | 1075 | 970 | — | 1710 | 3240 | 1115 | 2730 | 2770 | 3070 |
| (kg/cm$^2$) | 135 | 75.5 | 68.1 | — | 120 | 228 | 78.4 | 192 | 195 | 260 |
| HMOR (psi) | 425 | 280 | 205 | 725 | 370 | 340 | — | 480 | — | 270 |
| (kg/cm$^2$) | 29.8 | 19.7 | 14.4 | 51.0 | 26.0 | 23.9 | — | 33.7 | — | 19.0 |

**unfired
*ignited at 1093° C

The alumina used in all the compositions was that sold by Reynolds Aluminum Company under the designation RC-152 DBM. It contains over 99.7% $Al_2O_3$, there being less than 0.1% each of $Na_2O$, $SiO_2$, and $Fe_2O_3$; 90% is of the alpha phase. It is all less than 44 microns in size, having an average particle diameter of 1.6 microns and a specific surface of 4.7 m$^2$/g. Its particle size distribution is relatively narrow, 50% of the material being between 1 micron and 2.2 microns in size.

As to the bonds used, the number indicates the amount in parts by weight and the letter indicates the type, E being epsom salts, L a lignosulfonate binder, M calcined $MgSO_4$, and P the long chain glassy polyphosphate (average chain length about 20) sold (by FMC) under the brand name "Glass H". The amount of mixing water used is given in percent, based on the total weight of dry ingredients.

Each of the compositions shown was formed into bricks under the pressures indicated and, with the exception of compositions 5 and 6, fired to the indicated temperature. Various characteristics of these compositions, including modulus of rupture at room temperature (CMOR) and at 1482° C. (HMOR), are shown. It can be seen that, even for firing temperatures as low as 1400° C., the compositions show a slight shrinkage (i.e., "linear change" is negative) and none show a firing expansion as compared to the formed, unfired state. It will be noted that the porosities of these compositions are as low as 14 volume percent or less, which is considered very low. Compositions 5 and 6 indicate that the compositions of this invention need not be fired, but have very good properties when formed into chemically bonded shapes.

In Table II are shown certain comparison examples illustrating the inferiority of compositions made with aluminas other than that specified for use in this invention. Each of these was made with 90.4 parts of grain A, in the same sizing used in Composition 1, together with 8.1 parts of the alumina indicated that 1.5 parts calcined magnesium sulfate binder.

Aluminas J and K are tubular aluminas supplied by the Aluminum Company of America. J was nominally minus 65 mesh, although nearly 6% was coarser than 0.59 mm (+28 mesh) and about 12% was finer than 44 microns (minus 325 mesh). Chemically it was 99.6% $Al_2O_3$ with 0.1% $Na_2O$, 0.2% $SiO_2$, and 0.1% $Fe_2O_3$; 95% was of the alpha phase. Alumina K was of substantially the same chemistry, except that the $Fe_2O_3$ was 0.3% (and the $Al_2O_3$ correspondingly less), the increase being due to grinding; it was substantially all (99%) smaller than 44 microns (minus 325 mesh).

Aluminas L and M are calcined aluminas containing over 99.2% $Al_2O_3$, about 0.4% $Na_2O$ and a few hundredths percent each of $SiO_2$ and $Fe_2O_3$. Alumina L was unground, substantially all being finer than 0.21 mm (minus 65 mesh); about 9% was finer than 44 microns (minus 325 mesh). Alumina M was ground so that substantially all (99%) was finer than 44 microns; it had an average particle diameter of about 6 microns and a specific surface of 0.5 m$^2$/g.

Alumina N was a nominal minus 65 mesh bauxite containing 89.0% $Al_2O_3$, 0.2% $Na_2O$, 6.2% $SiO_2$, 3.1% $TiO_2$ and 1.5% $Fe_2O_3$. About 10% was coarser than 0.30 mm (+48 mesh) and about 45% was finer than 44 microns.

Alumina P was a finely sized, calcined floury alumina obtained from Guinea. It contained over 99.2% $Al_2O_3$ (73% being the alpha phase) and about 0.7% $Na_2O$, with about 0.01% each of $SiO_2$ and $Fe_2O_3$. Substantially all of it was finer than 0.21 mm (minus 65 mesh) and about 45% was finer than 44 microns.

Table II

| Composition | 11 | 12 | 13 | 14 | 15 | 16 | 17 |
|---|---|---|---|---|---|---|---|
| Alumina Type | J | K | L | M | N | P | Q |
| Water (%) | 4.0 | 4.25 | 4.25 | 4.25 | 4.25 | 4.25 | 4.25 |
| Linear Change (%) | +0.2 | 0.0 | +0.2 | +0.1 | +0.2 | −0.1 | −0.2 |
| Porosity (Vol %) | 20.1 | 19.7 | 21.7 | 19.1 | 20.6 | 20.8 | 24.8 |
| CMOR (psi) | 340 | 755 | 380 | 905 | 600 | 630 | 240 |
| (kg/cm$^2$) | 23.9 | 53.1 | 26.7 | 63.5 | 42.2 | 44.2 | 16.8 |
| HMOR (psi) | 200 | 330 | 190 | 330 | 125 | 235 | 190 |
| (kg/cm$^2$) | 14.1 | 23.2 | 13.4 | 23.2 | 8.8 | 16.5 | 13.4 |

Alumina Q is an electrostatic precipitator dust analyzing about 98% $Al_2O_3$ (ignited basis) and having a specific surface of 81 m$^2$/g; about 95% was finer than 44 microns. Alumina Q is similar to that used in U.S. Pat. No. 3,950,504; as can be seen, compositions made according to the present invention have properties superior to those of compositions made with this alumina disclosed in the prior art.

Each of the comparison compositions was mixed with the amount of tempering water indicated in Table II, pressed into brick at 10,000 psi, and fired to a temperature of 1400° C. The properties of the compositions after firing are indicated in Table II, including the modulus of rupture at 1482° C. (HMOR). It will be noted that most showed expansion upon firing, and all had considerably higher porosities than that of Composition 1, with which these comparison compositions can be directly compared. In addition, the cold modulus of rupture strength of these comparison compositions is considerably less than that of Composition 1.

These results indicate that the matrix bonding of the comparison compositions is not as good as that of Composition 1, and that the latter composition has a much denser structure.

In addition to the comparison compositions shown in Table II, an attempt was made to form a similar comparison composition using substrate alumina (i.e., alumina intended for use as a catalyst support) with a specific surface of 334 m²/g, but the mix was so fluffy that it could not be pressed to a selfsupporting shape.

Mesh sizes referred to herein are Tyler's Standard Screen Sizes. In the specification and claims, percentages and parts are by weight unless otherwise indicated, except that porosities are expressed in volume percent. Analyses of mineral components are reported in the usual manner, expressed as simple oxides, e.g. MgO and SiO$_2$, although the components may actually be present in various combinations, e.g. as a magnesium silicate. Specific surfaces reported are by the nitrogen adsorption method.

What is claimed is:

1. A refractory shape having 16 vol % or less porosity in either the fired or unfired form consisting essentially of from 60 to 80 percent magnesia refractory aggregate coarser than 44 microns and sized for good brickmaking to achieve maximum density and from 40 to 20 percent refractory matrix material finer than 44 microns, said matrix material being adapted to form magnesium aluminate spinel upon heating to a temperature of at least 800° C. and consisting essentially of from 15 to 25 percent magnesia containing at least 95% MgO and having a specific surface of at least 5,000 cm²/g, and from 4 to 15 percent alumina having a specific surface of from 2 to 30 m²/g and an average particle size of less than 5 microns, all percentages being by weight and based on the total weight of aggregate and matrix material, said refractory exhibiting no expansion, as compared with its formed but unfired state, after having been heated to a temperature of 1400° C.

2. Refractory composition according to claim 1 wherein the fine magnesia contains at least about 98% MgO.

3. Refractory composition according to claim 2 which contains about 8 percent fine alumina.

4. Method of making a magnesium aluminate spinel bonded refractory comprising: (a) admixing from 60 to 80 percent magnesia refractory aggregate coarser than 44 microns and sized for good brickmaking to achieve maximum density with from 40 to 20 percent refractory matrix material finer than 44 microns, said matrix material being adapted to form magnesium aluminate spinel upon heating to a temperature of at least 800° C. and consisting essentially of from 15 to 25% magnesia containing at least 95% MgO and having a specific surface of at least 5,000 cm²/g and from 4 to 15% alumina having a specific surface of from 2 to 30 m²/g and an average particle size less than 5 microns; (b) compacting the admixture to a porosity of 16 vol % or less; and (c) heating the compacted admixture to at least 800° C.; all percentages being by weight and based on the total weight of aggregate and matrix material, and said refractory exhibiting no expansion, as compared with its formed but unfired state, after having been heated to a temperature of 1400° C.

5. Method according to claim 4 wherein the compacted material is heated to at least 1400° C.

6. Method according to claim 4 wherein the compacted material is heated to at least 1600° C.

7. Method according to claim 4 wherein the alumina has a specific surface of about 5 m²/g and an average particle size of less than 2 microns.

* * * * *